United States Patent
Bajgrowicz

(10) Patent No.: US 8,131,222 B2
(45) Date of Patent: Mar. 6, 2012

(54) METHOD AND APPARATUS FOR DETECTION AND PREVENTION OF CROSSTALK IN A MULTIPLE TUNER RECEIVER

(75) Inventor: Brian David Bajgrowicz, Marion, IN (US)

(73) Assignee: Thomson Licensing, Issy les Moulineaux (FR)

( * ) Notice: Subject to any disclaimer, the term of this patent is extended or adjusted under 35 U.S.C. 154(b) by 776 days.

(21) Appl. No.: 12/223,045

(22) PCT Filed: Feb. 2, 2007

(86) PCT No.: PCT/US2007/002861
§ 371 (c)(1),
(2), (4) Date: Jul. 21, 2008

(87) PCT Pub. No.: WO2007/092298
PCT Pub. Date: Aug. 16, 2007

(65) Prior Publication Data
US 2010/0231726 A1    Sep. 16, 2010

Related U.S. Application Data

(60) Provisional application No. 60/764,591, filed on Feb. 2, 2006.

(51) Int. Cl.
*H04B 17/00* (2006.01)
(52) U.S. Cl. ............... 455/67.13; 455/67.11; 455/67.14; 455/70; 455/226.1; 455/226.3; 375/349
(58) Field of Classification Search ............... 455/67.11, 455/67.13, 47.14, 70, 226.1–226.4, 132–141, 455/272–275, 276.1, 277.1, 277.2, 278.1, 455/67.14; 375/349
See application file for complete search history.

(56) References Cited

U.S. PATENT DOCUMENTS

| 3,735,266 A | | 5/1973 | Amitay | |
|---|---|---|---|---|
| 4,246,608 A | * | 1/1981 | Baker | 348/192 |
| 4,606,054 A | * | 8/1986 | Amitay et al. | 375/349 |
| 5,239,701 A | * | 8/1993 | Ishii | 455/180.1 |
| 5,691,727 A | * | 11/1997 | Cyzs | 342/361 |
| 6,172,970 B1 | * | 1/2001 | Ling et al. | 370/347 |
| 7,751,513 B2 | * | 7/2010 | Eisenhut et al. | 375/349 |

FOREIGN PATENT DOCUMENTS

GB    510296 A    7/1939

OTHER PUBLICATIONS

Search Report Dated Jun. 18, 2007.

* cited by examiner

*Primary Examiner* — Junpeng Chen
(74) *Attorney, Agent, or Firm* — Robert D. Shedd; Vincent E. Duffy; Michael A. Pugel

(57) ABSTRACT

Receivers using multiple tuners may introduce crosstalk between signals provided to the tuners. The disclosed embodiments relate to a method and apparatus for detecting and preventing crosstalk. A method is described that includes providing a signal to a first signal processing path, tuning to a channel in the signal provided through the first signal processing path, tuning to the channel in the signal through a second signal processing path, and determining that crosstalk exists if the channel is present on the second signal processing path. An apparatus is also described containing means for providing a signal to a first signal processing path, tuning to a channel in the signal provided through the first signal processing path, tuning to the channel in the signal through a second signal processing path, and determining that crosstalk exists if the channel is present on the second signal processing path.

11 Claims, 4 Drawing Sheets

METHOD AND APPARATUS FOR DETECTION AND PREVENTION OF CROSSTALK IN A MULTIPLE TUNER RECEIVER

This application claims the benefit under 35 U.S.C. §365 of International Application PCT/US2007/002861, filed Feb. 2, 2007, which was published in accordance with PCT article 21(2) on Aug. 16, 2007, in English and which claims the benefit under 35 U.S.C.§119 of a provisional application 60/764,591 filed in the United States on Feb. 2, 2006.

FIELD OF THE INVENTION

The present embodiments relate generally to the operation of receivers and more specifically to determining and preventing crosstalk between two or more signal inputs in a set top box.

BACKGROUND OF THE INVENTION

This section is intended to introduce the reader to various aspects of art, which may be related to various aspects of the present embodiments that are described and/or claimed below. This discussion is believed to be helpful in providing the reader with background information to facilitate a better understanding of the various aspects of the present embodiments. Accordingly, it should be understood that these statements are to be read in this light, and not as admissions of prior art.

Tuners and tuner systems, such as those used in satellite receiver set top boxes, have increasingly become more complex. For instance, multiple tuners can be used to simultaneously provide separate received signals to hard disk drives for recording and storage and to external display devices such as televisions as well as to other rooms in a home. Further, satellite service providers have increased capability by providing additional channel capacity as well as new signal modulation formats. The increased signal capability may require the tuners and tuner systems to operate with signals having a large variation in performance requirements and input conditions. The additional complexity and capability has subsequently strained the design requirements for the tuners and tuner systems.

In order for the tuner system used in a set top box to operate effectively, each tuner in the tuner system must be able to operate and receive signals independently and free of operational interference from signals supplied to the other tuners. The operation must be maintained regardless of whether the input signals originate from a common signal source or from separate streams or separate sources. One current approach to maintain effective tuner operation is to incorporate circuits and design requirements that provide electrical signal isolation between the tuners. Electrical signal isolation prevents one tuner from receiving a signal meant to be provided to another tuner in the set top box. The circuits and design requirements result in reducing or eliminating the coupling of electrical signal energy from one signal path into another, commonly referred to as crosstalk.

In some worst case design conditions, the crosstalk requirements between two tuners in a tuner system may require that electrical signal isolation be as high as seventy (70) decibels (dB). A requirement for such a high level of electric signal isolation results in a costly implementation as well as a technically challenging design. Unacceptable crosstalk levels may only exist under certain signaling conditions and crosstalk issues may be more easily eliminated in signaling conditions such as when only one signal stream is provided. It may be possible that crosstalk even in the remaining signaling conditions may be able to be prevented or controlled in some manner if the crosstalk can be detected. Therefore there is a need for an effective method and apparatus for determining and, when possible, preventing signal crosstalk between tuners in a tuner system.

SUMMARY OF THE INVENTION

The disclosed embodiments relate to a method and apparatus for receiving a signal, and determining and preventing crosstalk between signals. In one embodiment, a method includes providing a signal to a first signal processing path, tuning to a channel in the signal provided through the first signal processing path, tuning to the channel in the signal through a second signal processing path, and determining that crosstalk exists if the channel in the signal is present on the second signal processing path.

In another embodiment, a method includes tuning to a channel in a first signal supplied from a first signal source, measuring a signal characteristic of the channel in the first signal, tuning to a channel in a second signal supplied from a second signal source with the first signal source enabled, measuring a signal characteristic of the channel in the second signal with the first signal source enabled, removing the first signal source, measuring a signal characteristic of the channel in the second signal with the first signal source removed, and determining a crosstalk level between the first signal source and the second signal source based on said measured signal characteristics.

In another embodiment, an apparatus includes means for providing a signal to a first signal processing path, means for tuning to a channel in the signal provided through the first signal processing path, means for tuning to the channel in the signal through a second signal processing path, and means for determining that crosstalk exists if the channel in the signal is present on the second signal processing path.

In yet another embodiment, an apparatus includes means for tuning to a channel in a first signal supplied from a first signal source, means for measuring a signal characteristic of the channel in the first signal, means for tuning to a channel in a second signal supplied from a second signal source with the first signal source present, means for measuring a signal characteristic of the channel in the second signal with the first signal source present, means for removing the first signal source, means for measuring a signal characteristic of the channel in the second signal with the first signal source removed, and means for determining a crosstalk level between the first signal source and the second signal source based on the measured signal characteristics.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following describes a system and circuits used for receiving satellite signals. Other systems utilized to receive other types of signals where the signal input may be supplied by some other means may include very similar structures. Those of ordinary skill in the art will appreciate that the embodiment of the circuits described herein is merely one potential embodiment. As such, in alternate embodiments, the components of the circuit may be rearranged or omitted, or additional components may be added. For example, with minor modifications, the circuits described may be configured to for use in non-satellite video and audio services such as those delivered from a cable network.

Figure 1:
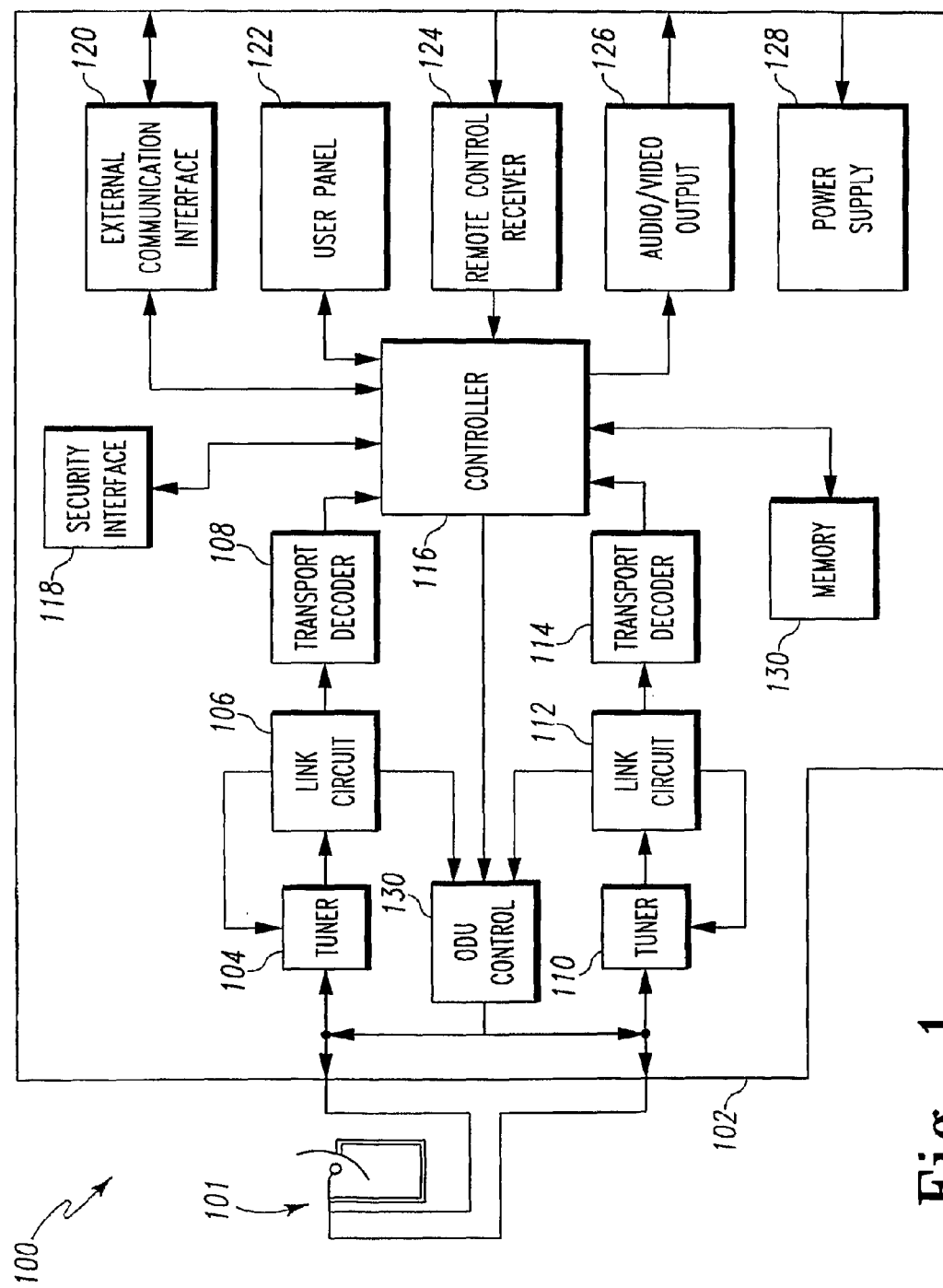
FIG. 1 is a block diagram of an exemplary system using an embodiment of the present invention.

Turning now to the drawings and referring initially to FIG. 1, an exemplary embodiment of a satellite signal receiving system 100 using aspects of the present invention is shown. Satellite signal streams, each containing a plurality of channels, are received by outdoor unit (ODU) 101. ODU 101 includes a dish for capturing and focusing the propagated radio wave from the atmosphere onto one or more antennas contained within a structure known as a low noise block converter (LNB). ODU 101 may be configured to receive the signal streams from satellite transponders located on one or more satellites. In a preferred embodiment, two sets of sixteen channels are received by ODU 101, and converted, using one or more LNBs to a frequency range of 950 to 2150 megahertz (MHz), referred to as L-band.

ODU 101 provides multiple converted signal streams to the set top box 102 through radio frequency (RF) coaxial cable. In a preferred embodiment, set top box 102 may receive as many as two separate signal streams from the ODU 101. Each of these separate signal streams is processed in a separate signal processing path. The upper signal path contains a tuner 104, a link circuit 106, and a transport decoder 108 with the signal path connected in a serial fashion. The lower path also contains a tuner 110, a link circuit 112, and a transport decoder 114 with the signal path also connected in a serial fashion. Each processing path may perform essentially identical signal processing on one of the split signal streams. Therefore only the upper signal processing path will be further described here.

One of the split signal streams from signal splitting circuit 102 is provided to tuner 104. Tuner 104 processes the split signal stream by selecting or tuning one of the channels in the split signal stream to produce one or more baseband signals. Tuner 104 contains circuits such as amplifiers, filters, mixers, and oscillators, for amplifying, filtering and frequency converting the split signal stream. Tuner 104 typically is controlled or tuned by link circuit 106. Alternately, tuner 104 may be controlled by another controller, such as controller 116 which will be described later. The control commands include commands for changing the frequency of an oscillator used with a mixer in tuner 104 to perform the frequency conversion.

Typically the baseband signals at the output of tuner 104 may collectively be referred to as the desired received signal and represent one satellite channel selected out of a group of channels that were received as the input signal stream. Although the signal is described as a baseband signal, this signal may actually be positioned at a frequency that is actually only near to baseband.

The one or more baseband signals from tuner 104 are provided to link circuit 106. Link circuit 106 typically contains the processing circuits needed to convert the one or more baseband signals into a digital signal for demodulation by the remaining circuitry of link circuit 106. In one embodiment the digital signal may represent a digital version of the one or more baseband signals. In another embodiment the digital signal may represent the vector form of the one or more baseband signals. Link circuit 106 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS).

Link circuit 106 also includes circuitry for characterizing the incoming baseband signal(s). The signal characterization may include measurements of relative signal level, signal to noise ratio, or digital signal bit error rate. Signal characterization is used to determine the signal quality of the incoming signal(s) and may include measurements at different points within the link circuit and control certain circuits within set top box 102 as well the generation of status signals such as a signal lock indication. A lock indication signal may be provided to controller 116 in order to indicate that a channel requested by, for instance, a user, has been correctly tuned and received by tuner 104 and link circuit 106. Additionally, if link circuit 106 contains an equalizer, characterization may include values derived from the equalizer elements.

In a preferred embodiment, the relative signal level is monitored as part of an automatic gain control loop for adjusting signal gain in tuner 104. A signal is provided from link circuit 106 to tuner 104 to adjust the signal gain in the tuner 104. The gain adjustment signal is based on link circuit 106 measuring the relative level of one or more baseband signals and integrating or smoothing the measured value over a time constant period of time. The smoothed value is compared to a threshold value and, if necessary, processed and provided to tuner 104 as the adjustment signal for a gain controllable amplifier in tuner 104.

The transport signal is provided to transport decoder 108. Transport decoder 108 typically separates the transport signal, which is provided as either a SPTS or MPTS, into individual program streams and control signals. Transport decoder 108 also decodes the program streams, and creates audio and video signals from these decoded program streams. In one embodiment, transport decoder 108 is directed by user inputs or through a controller such as controller 116 to decode only the one program stream that has been selected by a user and create only one audio and video signal corresponding to this one decoded program stream. In another embodiment, transport decoder 108 may be directed to decode all of the available program streams and then create one more audio and video signals depending on user request.

The audio and video signals, along with any necessary control signals, from both transport decoder 108 and transport decoder 114 are provided to controller 116. Controller 116 manages the routing and interfacing of the audio, video, and control signals and, further, controls various functions within set top box 102. For example, the audio and video signals from transport decoder 108 may be routed through controller 116 to an audio/video (NV) output 126. A/V output 126 supplies the audio and video signals from set top box 102 for use by external devices such as televisions or computers. Also, the audio and video signals from transport decoder 114 may be routed through controller 116 to memory block 130 for recording and storage. Memory block 130 may contain several forms of memory including random access memory (RAM), flash, hard media such as a hard disk drive. Memory block 130 may include a memory section for storage of instructions and data used by controller 116 as well as a memory section for audio and video signal storage. Controller 116 may also allow storage of signals in memory block 130 in an alternate form such as an MPTS or SPTS from transport decoder 108 or transport decoder 114.

Controller 116 is also connected to an external communications interface 120 such as a phone modem for providing phone connection to a service provider. External communication interface 120 provides signals for authorizing the use of the audio and video signals. Controller 116 also connects to a security interface 118, such as a smart card, for communicating signals for managing the use of the audio/video signals and preventing unauthorized use. User control is accomplished through user panel 122, for providing a direct input of user commands to control the set top box and remote control receiver 124, for receiving commands from an external remote control device. Both user panel 122 and remote control receiver 124 are connected to controller 116. Although not shown, controller 116 may also connect to the tuners 104, 110, link circuits 106, 112, and transport decoders 108, 114 to provide initial set-up information as well as for passing control information between the blocks. Finally, power supply 128 typically connects to all of the blocks in set top box 102 and supplies the power to those blocks as well as providing power to any of the elements needing power externally, such as the ODU 101.

Controller 116 also connects to and controls ODU control 130. ODU control 130 provides the signaling and power supply signals back to the ODU by providing these signals onto the coaxial cable(s) running between ODU 101 and set top box 102. In one embodiment, the ODU control 130 receives input control signals from controller 116 and provides different DC voltage levels to specific portions of the ODU 101 to provide a certain signal stream to each of the processing paths and inputs to tuner 104 and tuner 110. In another embodiment, the ODU control 130 receives inputs from controller 116 and also from link circuit 106 and link circuit 112 and provides DC voltage levels and a separate tuning control signal to ODU 101 using low frequency carrier based frequency shift keying modulation. Controller 116 also may send control commands to disable ODU controller 130 from providing either DC voltages or control signals to ODU 101.

It should be appreciated by one skilled in the art that the blocks described inside set top box 102 have important interrelations, and some blocks may be combined and/or rearranged and still provide the same basic overall functionality. For example, transport decoder 108 and transport decoder 114 may be combined and further integrate some or all of the functions of controller 116 to act as the main controller for set top box 102. Further, control of various functions may be distributed or allocated based on specific design applications and requirements. As an example, the processing paths for the two input signal streams may operate for specific types of signals. Tuner 104, link circuit 106, and transport decoder 108 may receive, demodulate, and decode signals employing a high definition audio and video format while tuner 110, link circuit 112, and transport decoder 114 may receive signals for maintaining the operation of a program guide.

Set top box 102 may also be configured to receive two or more separate signal streams in some modes of operation, and only one signal stream in other modes of operation. In modes only utilizing one signal stream, set top box 102 may include provisions for providing the single signal stream into both processing paths, in accordance with aspects of the present invention. The provision for applying a second signal stream to set top box 102 even in a mode where only one signal stream is used may inadvertently provide potential performance issues resulting from unwanted signal interference due to crosstalk. In such cases, both detecting and preventing crosstalk in set top box 102 may be important to maintaining proper operation in accordance with aspects of the present invention.

Figure 2:
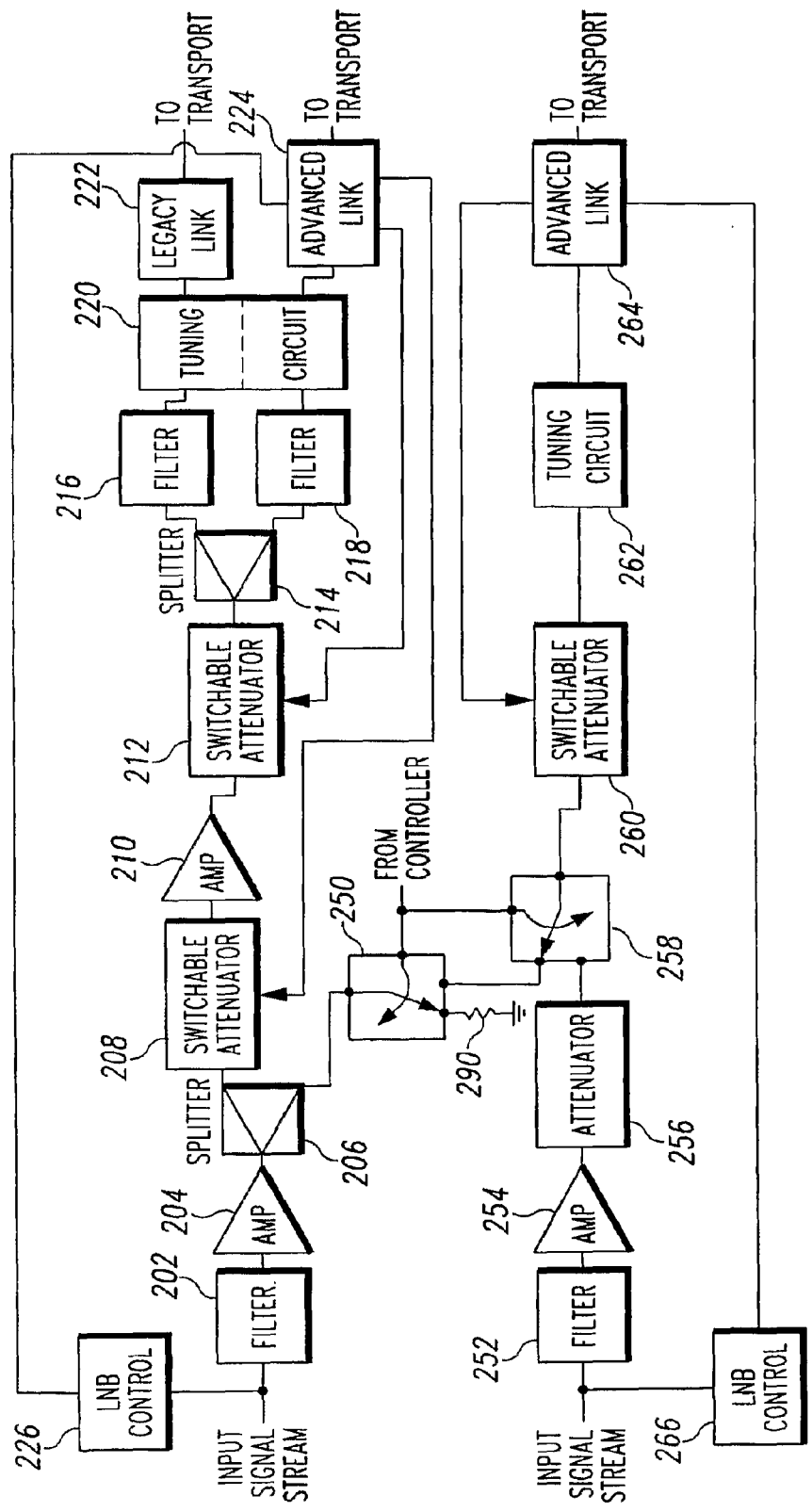
FIG. 2 is a block diagram of an embodiment of the present invention.

Turning to FIG. 2, a block diagram illustrating a receiving circuit 200 such as found in a set top box 102 is shown. The receiving circuit 200 includes processing blocks for receiving one or more signal streams in multiple signal formats. The receiving circuit 200 also includes processing blocks for receiving at least a portion of a signal stream associated with providing program or channel guide information.

A first signal stream is provided at the upper signal processing path to filter 202 and amplifier 204. Filter 202 removes undesired signal energy from the signal, particularly signal energy outside of the frequency range of interest for the channels contained in the signal stream. Amplifier 204 provides signal gain, increasing the signal power level of the incoming signal stream. The main purpose of increasing signal level is to overcome additional signal level loss in other circuits in the signal processing path.

The amplified signal stream at the output of amplifier 204 is provided to splitter 206. Splitter 206 generates two split signal output streams by dividing the signal power into two paths. Splitter 206 may split the signal power equally between the two split signal paths. Splitter 206 may alternately divide the signal power in a way to provide more of the original signal power in one split output stream and less signal power in the other split output stream.

One split signal from splitter 206 is provided to switchable attenuator 208 and amplifier 210. Amplifier 210 has the same function as described for previously. Switchable attenuator 208 provides signal attenuation, reducing the signal level of the signal passing through. Switchable attenuator 208 may include a network of resistors to form one or more attenuator circuits and one or more switches for switching attenuators in and out of the signal processing path. In a preferred embodiment, switchable attenuator 208 can switch between zero (0) dB attenuation and fifteen (15) dB attenuation. Switchable attenuator 208 also includes a control input for controlling the switching function. The control input selects which attenuator setting is used during signal processing. A control signal is provided by either a link circuit or a controller.

The further processed signal stream from amplifier 210 is provided to a second switchable attenuator 212 and into signal splitter 214. The function and operation of switchable attenuator 212 is the same as described previously. The function and operation of signal splitter 214 is also the same as described previously. Each of the two outputs of signal splitter 214 is provided to a filter, filter 216 or filter 218, and a tuning circuit 220. Filters 216 and 218 provide additional filtering for undesired signal energy similar to the filtering described previously. Tuning circuit 220 contains processing circuits such as mixers and oscillators for tuning two separate channels within the input signal stream. A control signal from a controller, not shown, or from link circuits 224, 264 connected to tuning circuit 220 provide tuning control commands for tuning to channels present in the signal stream.

One output of tuning circuit 220 is provided to legacy link 222. Legacy link 222 demodulates and decodes signals using an older signal format used for satellite signal transmission. In a preferred embodiment, legacy link 22 can demodulate and decode signals using quarternary phase shift keying (QPSK) modulation and Viterbi and Reed-Solomon error correction format. The other output of tuning circuit 220 is provided to advanced link 224. Advanced link 224 demodulates and decodes signals using newer advance signal formats used in satellite signal transmission in addition to being able to demodulate and decode signals in the older legacy signal format. In a preferred embodiment, advanced link 224 can demodulate and decode signals using eight level phase shift keying (8-PSK) modulation and turbo-code, low density parity check (LDPC), or Bose, Chaudhuri, and Hocquenghem (BCH) error correction format in addition to QPSK modulation and Viterbi and Reed-Solomon error correction format. Legacy link 222 and advanced link 224 each provide outputs such as transport signal outputs for further processing including audio and video decoding and displaying.

As previously stated, advanced link 224 provides the control signal for switchable attenuator 208 and switchable attenuator 212. The control signal is determined by advanced link 224 based on signal characterization performed on the tuned channel from the signal stream. In addition, a controller, not shown, may provide control information used by advanced link 224 for controlling switchable attenuators 208 and 212. Alternately, a controller may provide control signals directly to switchable attenuators 208 and 212.

Advanced link 224 also provides a control signal to LNB control 226. LNB control 226 provides signals for operating ODU 101 as described previously. LNB control 226 may include processing circuitry for generating control signal. LNB control 226 may alternately include a switch for connecting or disconnecting a DC power supply into the signal processing path. The DC power supply, not shown; is used for powering circuitry in ODU 101.

The second signal output from signal splitter 206 is provided to common terminal of switch 250. Switch 250 permits the signal from the upper signal processing path to be provided to the lower signal processing path, as will be described later. Switch 250 is preferably a double pole double throw (DPDT) switch and may be implemented using either a relay circuit or electrical circuits including transistors and diodes. One switched terminal of switch 250 is connected to circuits used in the lower signal processing path, described later. Another switch terminal of switch 250 is connected to resistor termination 290 to properly terminate the output connection of splitter 206 when the signal stream from the upper signal processing path is not provided to the lower signal processing path.

In addition, if the cable connection delivers a second signal stream to set top 102, the second signal stream is provided in the lower signal processing path to filter 252, amplifier 254, and attenuator 256. Filter 252 and amplifier 254 have similar operation and function as described previously. Attenuator 256 contains a fixed network of components such as, but not limited to, resistors and reduces the signal level as the signal stream passes through. Attenuator 256 may also provide some buffering of signal stream characteristics, such as, but not limited to, impedance, presented to amplifier 254. In a preferred embodiment, attenuator 256 creates three (3) dB of signal loss.

The attenuated lower signal stream is provided on a switch terminal of switch 258. Switch 258, along with switch 250, described previously, allow either the signal stream originating in the upper signal processing path or the signal stream originating in the lower signal processing path to be further provided to the remaining circuits in the lower signal processing path. Switch 258 is preferably a DPDT switch and may be implemented using either a relay circuit or electrical circuits including transistors and diodes. The other switch terminal of switch 258 is connected to one of the switch terminals of switch 250 as described previously. The common terminal of switch 258 provides either the signal stream from the upper signal processing path or the signal stream provided to the input of the lower signal processing path to the remaining circuits in the lower signal processing path.

Switch 250 and switch 258 each have a control signal input. The control signal for each control signal input is provided from a controller. Alternately, the control signal may be provided from a link circuit such as legacy link 222 or advanced link 224. In a preferred embodiment, the control signal inputs for switch 250 and switch 258 are connected together and a common control signal is provided.

The signal stream at the output or common terminal of switch 258 is provided to switchable attenuator 260. Switchable attenuator 260 has function and operation as described previously. The signal output from switchable attenuator 260 is provided to tuning circuit 262. Tuning circuit 262 contains circuits similar to those described for tuning circuit 220 but only tunes to a single channel from the channels in the signal stream. The output of tuning circuit is provided to advanced link 264. Advanced link 264 operates and functions in a manner similar to advanced link 224 and provides a transport signal output for further processing.

Advanced link 264 provides a control signal for switchable attenuator 260 and LNB control 266. The control signals and operation of advanced link 264 with switchable attenuator 260 and LNB control 260 are similar to those described previously for advanced link 224, switchable attenuators 208 and 212, and LNB control 226.

The added complexity of the circuit arrangement in receiving circuit 200, such as allowing multiple tuners to utilize signal streams from more than one signal processing path, complicates performance requirements. Proper operation of the tuners may require the ability of determining if crosstalk between the signal processing paths is present, in accordance with aspects of the present invention. Further, adjustment of signal characteristics of the signal processing paths using circuits such as the attenuators described above, in accordance with aspects of the present invention, may eliminate or prevent crosstalk in the signal processing paths.

Figure 3:
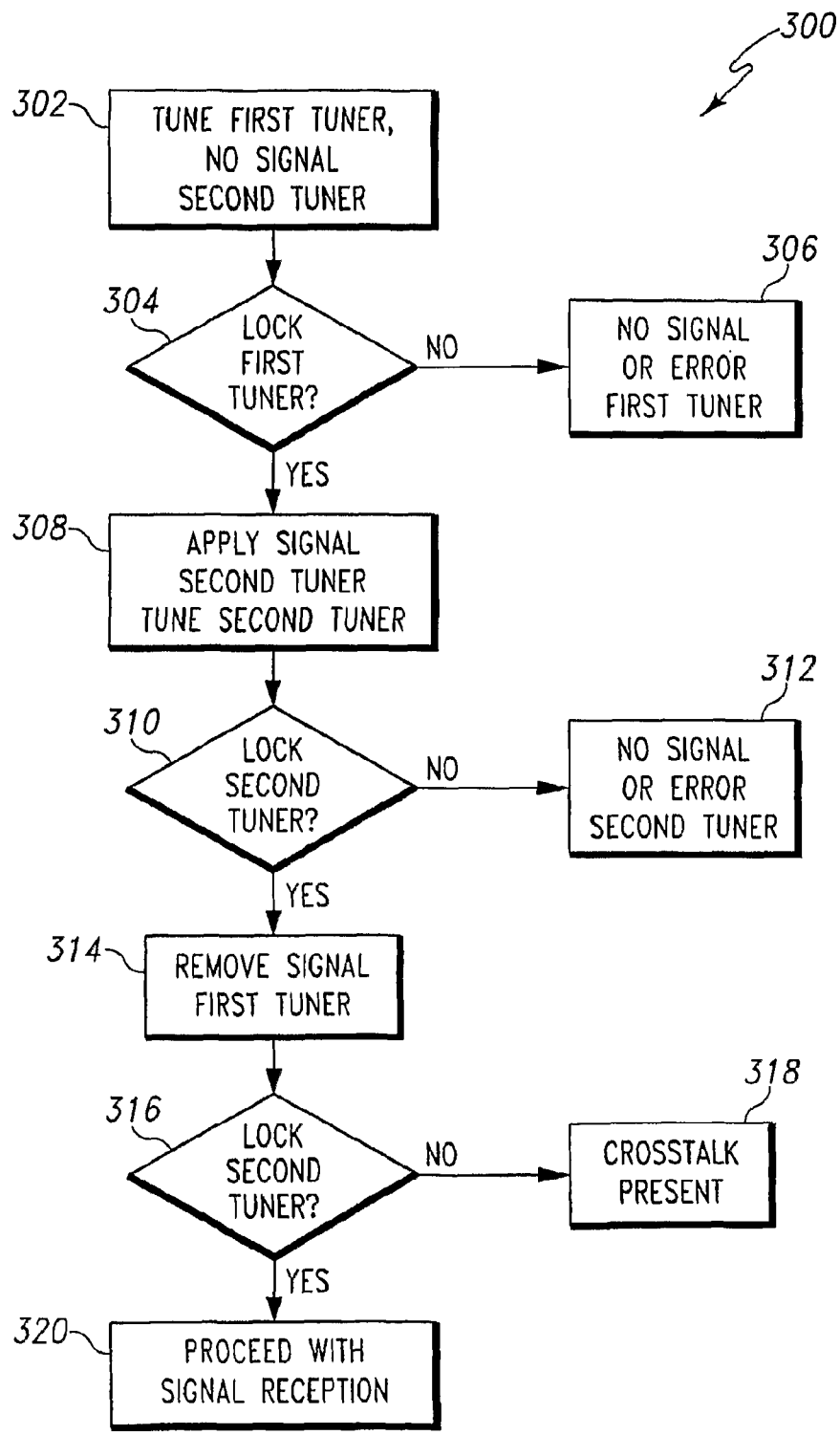
FIG. 3 is a flow chart illustrating an exemplary process of an embodiment of the present invention.

Turning to FIG. 3, a flow chart illustrating an exemplary process 300 for determining and preventing crosstalk using aspects of the present invention is shown. Typically, process 300 may be performed as part of set up of set top box 102 by the user. In addition, process 300 may be done as part of initial installation or any time changes are made associated with connection of signal streams provided to set top box 102.

At step 302, when a signal stream is not provided or present on one of the signal processing paths, such as the lower path, of set top box 102, the tuner for the other signal processing path, such as tuner 104 is commanded to tune to a channel. The channel tuned should be a channel present among the channels in the signal stream provided to tuner 104. The signal stream present in the lower signal processing path may be removed or prevented from reaching the set top box 102 by, for instance, commanding the ODU control 130 to disable or turn off the LNB circuit in the ODU 101 used for supplying the signal to the lower signal processing path.

Next at step 304, the lock condition signal, generated by signal characterization of the tuned channel by link circuit 106 in the active signal processing path is checked. The lock condition signal may be monitored continuously by controller 116. If continuous monitoring is used, the lock condition signal may need to be checked several times over a short period of time, such as 5 seconds, after commanding the tuner to tune. The lock condition signal may also be provided as, for instance, an interrupt command through a control bus connected to controller 116.

If the lock condition signal indicates that no signal lock has been generated for the tuned channel, at step 306, an error is indicated. The error may be used to indicate that no signal is present or that the desired channel is not present in the signal stream. The error may further indicate that an incorrect or invalid channel has been tuned or that there is some hardware operation problem in set top box 102. In order to eliminate some of the potential errors due to an incorrect, invalid, missing channel, additional commands may be provided to the tuner 104 to tune to additional channels and repeat steps 302 and 304, if necessary.

Further, valid lock condition only indicates that link circuit 106 has received a signal with sufficient signal characteristics, such as signal strength, that circuits in link circuit 106 can process the signal. Signal may still be present in the signal processing path, but may be below a signal characteristic threshold needed for determining a valid lock condition.

If, at step 304, the lock condition signal indicates that signal lock has been generated for the tuned channel then, at step 308, a signal is provided to input of the lower signal processing path and a command is provided to tuner 110 to tune a channel. The channel tuned by tuner 110 is preferably the same channel as the channel tuned for the first tuner, tuner 104. The signal for tuner 110 may be provided by commanding ODU control to enable or turn on the LNB circuit in the ODU 101 used for supplying the signal to the lower signal processing path.

Next, at step 310, generated by signal characterization of the tuned channel by link circuit 112 in the now active lower signal processing path is checked. The lock condition signal may be checked in a manner similar as described previously.

If the lock condition signal indicates that no signal lock has been generated for the tuned channel, at step 312, an error is indicated. The error may be used to indicate that no signal is present or that the desired channel is not present in the signal stream. The error may further indicate an incorrect or invalid channel has been tuned or that there is some hardware operation problem in set top box 102. The error may also indicate that no signal stream has been provided to the lower signal processing path. For instance, it is possible that the input cable is not connected. The error at step 312 may also indicate that no crosstalk or minimal crosstalk may be present from the signal provided through the upper signal path.

As described earlier, in order to eliminate some of the potential errors indicated due to an incorrect, invalid, non-present channel, further commands may be provided to tuner 104 to tune to additional channels and repeat steps 302 and 304. The error at step 312 may also indicate that no crosstalk is present. However, due to the possible other errors described, the conclusion that crosstalk is not present may not be accurate based on the determination at step 312.

If, at step 310, the lock condition signal indicates that signal lock has been generated for the tuned channel then, at step 314, the signal originally provided to the first or upper signal path is removed. As described previously, the signal stream for the lower signal processing path may be removed or prevented from reaching the set top box 102 by, for instance, commanding the ODU control 130 to disable or turn off the LNB circuit in the ODU 101 used for supplying the signal to the lower signal processing path, as described previously.

Next, at step 316 the condition signal generated by signal characterization of the tuned channel by link circuit 112 in the now active lower signal processing path is checked again. If the lock condition signal no longer indicates that lock condition exists, then at step 318, another error condition is indicated. The error indication at step 318 now indicates that some sort of crosstalk of signal streams is present. As a result of the error determination at step 318, corrective action may be taken to prevent crosstalk. The corrective action may include disabling the lower signal processing path, using a method such as that described previously, while a signal stream is processed in the upper signal processing path.

If the lock condition signal indicates that the signal lock has remained despite removing the signal stream from the originally used signal processing path, valid signal streams may be present at one or both signal processing path inputs to set top box 102. Further, the signal stream originally provided to the first, or upper, signal processing path is the desired signal stream containing the channel tuned by the first tuner. At step 320, signal processing, including further signal demodulation, in the set top box may continue.

Although not shown, steps 302, 310, 314, and 316 may be repeated as a way of verifying certain conditions for the lock condition signal in link circuit 106 and link circuit 112 with respect to the signal stream present in either the upper or lower signal processing path. The repeating of the steps would provide additional verification that, for instance, crosstalk was present between the two signal processing paths. Further, steps in process 300 may be re-allocated to allow step 302 to start with tuning a channel in the signal stream provided to the lower signal processing path. Typically crosstalk occurs equally between signal processing paths, but crosstalk levels may not be equal in each signal processing path due to differences in signal levels of the various signal streams present.

Process 300 is described including steps that enable or disable a certain signal stream. Alternatively, one of the signal streams may be altered in a manner that assures it cannot be processed using the same processing steps to produce an affirmative lock signal condition as used for the first signal stream. For example, the second signal stream may be shifted in frequency or inverted in frequency relative to the known or expected frequencies for the first signal stream. The set top box 102, may further command the ODU to select a second signal stream that is from a satellite source or signal polarization that is known to be or is expected to be different from the first signal stream. Process 300 may then, for instance, be modified to account for tuning a different channel from the second signal stream.

Although the signal processing paths described in process 300 include the circuitry present in set top box 102, it should be important to note that the signal processing paths may extend to include the cabling for providing the signal streams, and further may include circuitry associating with receiving the signal streams in ODU 101. This is because crosstalk may also occur in signal processing paths outside set top box 102, such as the cabling for providing the signal streams to set top box 102.

Further, although process 300 describes one approach for altering signal processing paths involving enabling and disabling signal streams in signal processing paths, other methods may be used. The approach used for either disabling or enabling signal streams may also include changing the second signal stream with respect to the first signal stream. The choice of approach may depend on operational issues with the set top box 102, in accordance with aspects of the present invention. For instance, certain approaches such as disabling or enabling the second signal stream may not be completely practical due to constraints outside set top box 102 when the signal stream is provided to other set top boxes. It may then be possible to incorporate several or all of the possible signal stream control approaches, in accordance with the present invention, either individually, or in conjunction with each other, in order to produce a more robust or useful method of crosstalk prevention.

Figure 4:
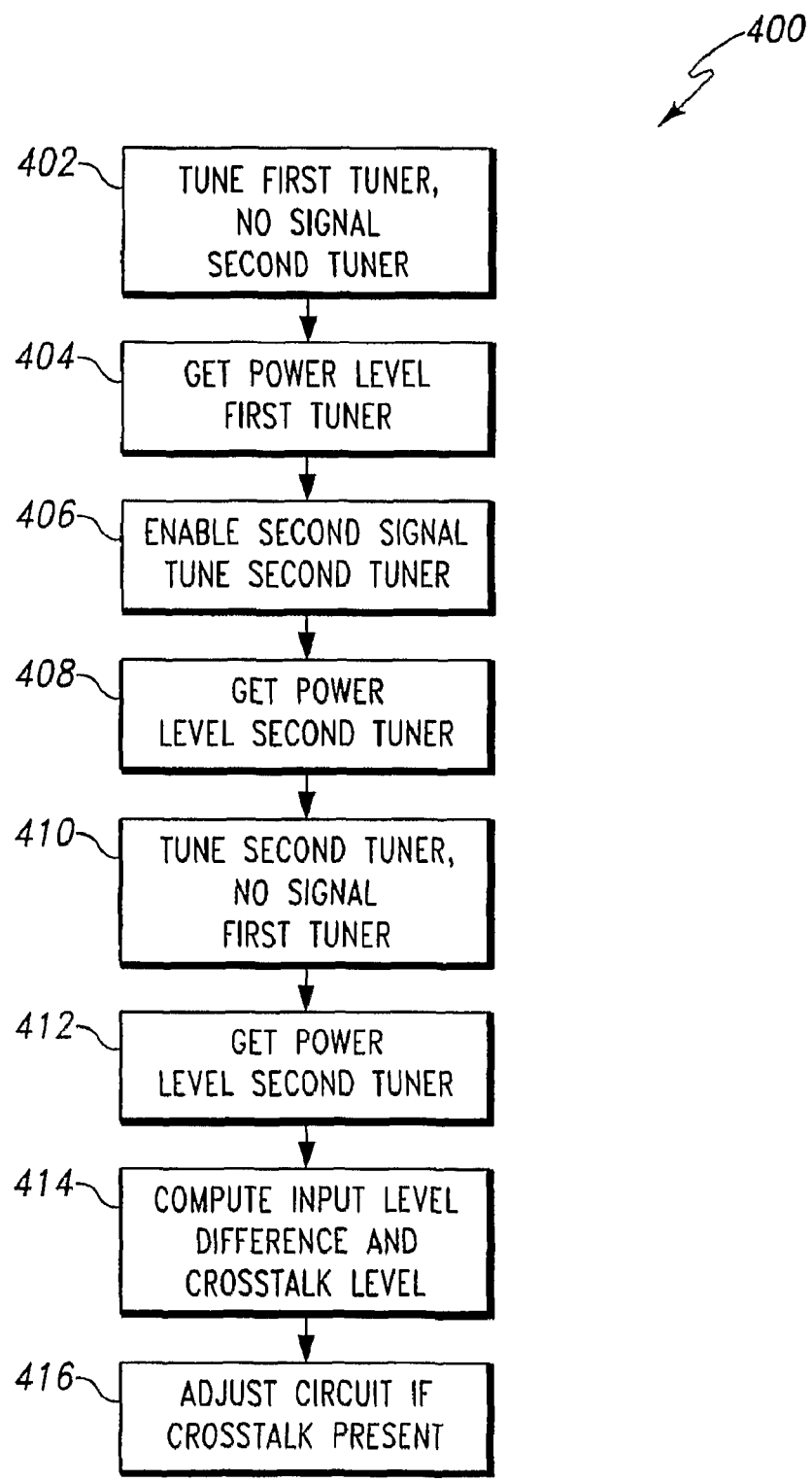
FIG. 4 is a flow chart illustrating another exemplary process of an embodiment of the present invention.

Turning to FIG. 4, a flow chart illustrating another exemplary process 400 for determining and preventing crosstalk using aspects of the present invention is shown. Process 400 may be used in conjunction with process 300 either successively or simultaneously. For instance, process 400 may be commenced at step 320 of process 300. Alternately, certain steps, such as steps 404, 408, and 412 of process 400 described below may be performed simultaneously with certain steps, such as steps 304, 310, and 316 of process 300.

At step 402, in the absence of a signal stream provided to one of the signal processing paths, such as the lower path, of set top box 102, the tuner in the other signal processing path, such as tuner 104 is commanded to tune to a channel. The channel tuned should be a channel present among the channels in the signal stream provided to tuner 104. The signal stream for the lower signal processing path may be enabled or disabled at this step, as well as other steps described later, in a manner similar to that described in process 300.

Next, at step 404, a received signal power level estimate for the first tuner is determined. The power level estimate is typically determined using signal characterization capabilities in a link circuit, such as link circuit 106. The signal power level estimate value may be stored in a memory, either in link circuit 106 or in another memory such as memory 130.

At step 406, the lower signal processing path is enabled, a signal is provided to the input of the lower signal processing path and a command is provided to tuner 110 to tune to a channel. The channel tuned by tuner 110 is preferably the same channel as the channel tuned for the first tuner, tuner 104.

Next, at step 408 a received signal power level estimate for the second tuner is determined. This power level estimate represents the unexpected signal power level or the undesired received signal power level for the channel tuned by tuner 110. The power level estimate is typically determined using signal characterization capabilities in a link circuit, such as link circuit 112. The undesired or unexpected received signal power level estimate for the second tuner represents an estimate of the signal power potentially created due to crosstalk of signal power from the first or upper signal processing path or with cabling associated with the first or upper signal processing path. The unexpected or undesired signal power level estimate for the second tuner may be stored in a memory, as described previously.

At step 410 the signal originally provided to the first or upper signal path is removed. After removal of the signal, at step 412 a second received signal power level estimate for the second tuner is determined in a link circuit such as link circuit 112. The second received signal power level estimate for the second tuner represents an estimate of the signal power of the tuned channel from the received signal stream provided to the second or lower signal processing path. The second signal power level estimate for the second tuner may be stored in a memory, as described previously.

After the signal power level estimates from steps 404, 408, and 412 have been determined then, at step 414 the values for the received signal power level estimate for the first tuner, the unexpected received signal power level estimate for the second tuner, and the second received signal power level estimate for the second tuner are retrieved from their respective memory locations, if necessary. The three values are then processed to determine an input level difference estimate and a crosstalk level estimate.

The computation of the input level difference estimate and crosstalk level estimate may be performed in a controller, such as controller 116. The computation may for instance, involve subtraction of the received signal power level estimate for the first tuner from the first received signal power level estimate for the second tuner to determine the input level difference. Further, the computation may involve subtraction of the input level difference and the second received signal power level estimate for the second tuner from the received signal power estimate for the first tuner to determine the crosstalk level estimate. Other computational algorithms may be used involving, for instance percentages of each of the signal level estimates. The computation may also include threshold conditions, or expected or known values of signal levels associated with the signal processing paths and signal streams.

If the computation at step 414 indicates that crosstalk may be present then, at step 416, adjustment of circuits within the set top box 102 may be done in order to prevent or mitigate crosstalk. In a preferred embodiment, switchable attenuators 208, 212, and 260 are adjusted. The method of adjustment may be determined by design, and may depend on the controller used, whether the control all of the attenuators is performed by multiple link circuits or a single controller. One method may be to make adjustment of one attenuator, such as attenuator 208, and then repeat the steps of process 400. The attenuator setting changes are continued through all possible combinations until a setting is found that eliminates crosstalk. Alternately, all possible combinations of attenuator settings may also be tried and the combination of attenuator settings chosen that produces the lowest level of crosstalk.

Process 400 describes determining a cross talk level estimate and signal level estimate using signal power measurements made by link circuit 106 and link circuit 112. It may also be possible that a cross talk level estimate or signal level estimate may be determined using other signal characterization qualities in link circuit 106 and link circuit 112. For instance, a measurement of signal to noise ratio (SNR) performed in link circuit 106 and link circuit 112 may be used to determine a crosstalk level estimate.

It should be understood that processes 300 and 400 are described relative to a first tuner in a first signal processing path defined as the upper signal processing path in set top box 102. Processes 300 and 400 could additionally begin with the first tuner described in the first signal processing path defined as the lower signal processing path and proceed to reverse only the identified processing paths with no change to the flow of processes 300 and 400. Further, processes 300 and 400 are described utilizing two tuners and two input signal streams. However, the processes 300 and 400 can be extended to any number of separate signal streams provided through separate connections to any number of tuning circuits within set top box 102 by either adding steps, similar to those described, to or iterating some or all of the process itself.

While the disclosure may be susceptible to various modifications and alternative forms, specific embodiments have been shown by way of example in the drawings and are described in detail herein. However, it should be understood that the disclosure is not intended to be limited to the particular forms disclosed. Rather, the disclosure is to cover all modifications, equivalents and alternatives falling within the spirit and scope of the disclosure as defined by the following appended claims.

What is claimed is:

1. A method for determining crosstalk between signal sources, the method comprising the steps of:
   tuning to a channel in a first signal supplied from a first signal source;
   measuring a signal characteristic of said channel in said first signal;
   tuning to a channel in a second signal supplied from a second signal source with said first signal source enabled;
   measuring a signal characteristic of said channel in said second signal with said first signal source present;
   disabling said first signal source;
   measuring a signal characteristic of said channel in second signal with said first signal source disabled; and
   determining a crosstalk level between said first signal source and said second signal source based on said measured signal characteristic of said channel in said first signal, said measured signal characteristic of said channel in said second signal with said first signal source present, and said measured signal characteristic of said channel in second signal with said first signal source disabled.

2. The method as in claim 1, the method further comprising the step of adjusting at least one of said first signal and said second signal in response to said step of determining a crosstalk level.

3. The method as in claim 2, wherein said step of adjusting at least one of said first signal and said second signal includes switching signal attenuation in a signal processing path using switchable attenuators.

4. The method as in claim 1, wherein said signal characteristic is signal power level.

5. An apparatus for determining crosstalk between signal sources, the apparatus comprising:
   means for tuning to a channel in a first signal supplied from a first signal source;
   means for measuring a signal characteristic of said channel in said first signal;
   means for tuning to a channel in a second signal supplied from a second signal source with said first signal source present;
   means for measuring a signal characteristic of said channel in said second signal with said first signal source present;
   means for removing said first signal source;
   means for measuring a signal characteristic of said channel in said second signal with said first signal source removed; and
   means for determining a crosstalk level between said first signal source and said second signal source based on said measured signal characteristic of said channel in said first signal, said measured signal characteristic of said channel in said second signal with said first signal source present, and said measured signal characteristic of said channel in second signal with said first signal source removed.

6. The apparatus set forth in claim 5, further comprising means for adjusting at least one of said first signal and said second signal in response to said step of determining a crosstalk level.

7. The apparatus set forth in claim 6, wherein said means for adjusting at least one of said first signal and said second signal includes means for switching signal attenuation in a signal processing path using switchable attenuators.

8. An apparatus for determining crosstalk between signal sources, the apparatus comprising:
   a first tuner, said first tuner tuning to a channel in a first signal supplied from a first signal source;
   a switching circuit coupled to said first tuner, said switching circuit capable of enabling and disabling said first signal source;
   a first demodulator coupled to said first tuner, said first demodulator measuring a signal characteristic of said channel in said first signal;
   a second tuner, said second tuner tuning to a channel in a second signal supplied from a second signal source;
   a second demodulator coupled to said second tuner, said second demodulator measuring a signal characteristic of said channel in said second signal with said first signal source enabled, said second demodulator measuring a signal characteristic of said channel in said second signal with said first signal source disabled; and
   a controller coupled said first demodulator and said second demodulator, said controller determining a crosstalk level between said first signal source and said second signal source based on said measured signal characteristic of said channel in said first signal, said measured signal characteristic of said channel in said second signal with said first signal source enabled, and said measured characteristic of said channel in second signal with said first signal source disabled.

9. An apparatus for determining crosstalk in a signal, the apparatus comprising:
   a first tuner that tunes a channel in a signal, said signal provided to said first tuner in a first signal path;
   a first demodulator coupled to the first tuner, the first demodulator measuring a signal characteristic of said channel in said signal tuned by said first tuner;
   a second tuner that tunes a channel in said signal, said signal provided to said second tuner in a second signal path;
   a switching circuit coupled to said first tuner and said second tuner, said switching circuit disabling said signal in said first signal path;
   a second demodulator, coupled to the second tuner, the second demodulator measuring a signal characteristic of said channel in said signal tuned by said second tuner with said signal provided to said first tuner, the second demodulator also measuring a signal characteristic of said channel in said signal tuned by said second tuner with said signal disabled in said first signal path; and
   a controller coupled to the first demodulator and second demodulator, said controller determining a crosstalk level between said first signal source and said second signal source based on said measured signal characteristic of said channel in said signal tuned by said first tuner, said measured signal characteristic of said channel in said signal tuned by said second tuner with said signal provided to said first tuner, and said measured signal characteristic of said channel in said signal tuned by said second tuner with said signal disabled in said first signal path.

10. A method for determining crosstalk in a signal, the method comprising the steps of:
- tuning a channel in a signal provided to a tuner in a first signal path;
- measuring a signal characteristic of said channel in said signal tuned by said tuner in said first signal path;
- tuning a channel in said signal provided to a tuner in a second signal path;
- measuring a signal characteristic of said channel in said signal tuned by said tuner in said second path;
- disabling said signal in said first signal path;
- measuring a signal characteristic of said channel in said signal tuned by said tuner in said second signal path with said signal disabled in said first signal path; and
- determining a crosstalk level between said first signal source and said second signal source based on said measured signal characteristic of said channel in said signal tuned by said tuner in said first signal path, said measured signal characteristic of said channel in said signal tuned by said tuner in said second signal path, and said measured signal characteristic of said channel in said signal tuned by said second tuner with said signal disabled in said first signal path.

11. An apparatus for determining crosstalk in a signal, the apparatus comprising:
- means for tuning a channel in a signal provided in a first signal path;
- means for measuring a signal characteristic of said tuned channel in said signal provided in said first signal path;
- means for tuning a channel in said signal in a second signal path;
- means for measuring a signal characteristic of said tuned channel in said signal provided in said second path;
- means for disabling said signal in said first signal path;
- means for measuring a signal characteristic of said tuned channel in said signal provided in said second signal path with said signal provided in said first signal path disabled; and
- means for determining a crosstalk level between said first signal source and said second signal source based on said measured signal characteristic of said tuned channel provided in said first signal path, said measured signal characteristic of said tuned channel provided in said second signal path, and said measured signal characteristic of said tuned channel provided in said second signal path with said signal provided in said first signal path disabled.

* * * * *